United States Patent
Hedrick et al.

(10) Patent No.: US 7,114,487 B2
(45) Date of Patent: Oct. 3, 2006

(54) ICE-BREAKING, AUTOZERO AND FROZEN THROTTLE PLATE DETECTION AT POWER-UP FOR ELECTRONIC MOTORIZED THROTTLE

(75) Inventors: Jeffrey R. Hedrick, Tecumseh, MI (US); Ross D. Pursifull, Dearborn, MI (US); Chang Yang, Farmington Hills, MI (US)

(73) Assignee: Ford Motor Company, Dearborn, MI (US)

( * ) Notice: Subject to any disclaimer, the term of this patent is extended or adjusted under 35 U.S.C. 154(b) by 0 days.

(21) Appl. No.: 10/758,706

(22) Filed: Jan. 16, 2004

(65) Prior Publication Data

US 2005/0155574 A1    Jul. 21, 2005

(51) Int. Cl.
F02D 11/10    (2006.01)
(52) U.S. Cl. .................. 123/399; 251/129.11; 701/113
(58) Field of Classification Search ................ 123/396, 123/399, 397; 318/280; 251/129.09, 129.11; 251/305; 701/110, 114, 115
See application file for complete search history.

(56) References Cited

U.S. PATENT DOCUMENTS

| | | |
|---|---|---|
| 3,704,635 A | 12/1972 | Eshelman |
| 3,760,786 A | 9/1973 | Marsh |
| 4,612,615 A | 9/1986 | Murakami |
| 4,850,319 A * | 7/1989 | Imoehl .................. 123/361 |
| 4,854,283 A | 8/1989 | Kiyono et al. |
| 5,016,588 A | 5/1991 | Pagdin et al. |
| 5,050,552 A | 9/1991 | Riehemann |
| 5,074,267 A | 12/1991 | Ironside et al. |
| 5,078,110 A | 1/1992 | Rodefeld |
| 5,115,396 A | 5/1992 | Keegan |
| 5,193,506 A | 3/1993 | Ironside et al. |
| 5,255,653 A | 10/1993 | Ironside et al. |
| 5,263,448 A | 11/1993 | Bluhm et al. |
| 5,303,581 A | 4/1994 | McQueen |
| RE35,250 E | 5/1996 | McQueen |
| 5,568,386 A | 10/1996 | Sugiura et al. |
| 5,629,852 A | 5/1997 | Yokoyama et al. |
| 5,950,597 A | 9/1999 | Kamio et al. |
| 5,983,860 A | 11/1999 | Kitamura et al. |
| 6,129,071 A | 10/2000 | Pursifull |
| 6,167,866 B1 | 1/2001 | Jakisch et al. |
| 6,170,461 B1 | 1/2001 | Pursifull |
| 6,199,535 B1 | 3/2001 | Hara |
| 6,209,518 B1 | 4/2001 | Machida et al. |
| 6,237,564 B1 | 5/2001 | Lippa et al. |
| 6,240,899 B1 | 6/2001 | Yamada et al. |
| 6,276,331 B1 | 8/2001 | Machida et al. |
| 6,318,337 B1 | 11/2001 | Pursifull |
| 6,352,064 B1 | 3/2002 | Tomita et al. |
| 6,378,493 B1 | 4/2002 | Pursifull et al. |
| 6,397,816 B1 | 6/2002 | Pursifull |

(Continued)

FOREIGN PATENT DOCUMENTS

JP    59188050 A  * 10/1984

(Continued)

*Primary Examiner*—Stephen K. Cronin
*Assistant Examiner*—Arnold Castro
(74) *Attorney, Agent, or Firm*—Gregory P. Brown; MacMillan, Sobanski & Todd, LLC

(57) ABSTRACT

A method is disclosed for ensuring operation of a motorized throttle. The presence of an obstruction, such as ice, is detected inside the motorized throttle. The obstruction is then removed within a predetermined time to free the motorized throttle. A new closed throttle position is then recorded as a zero degree reference from which to control a throttle plate to a desired angle.

13 Claims, 5 Drawing Sheets

U.S. PATENT DOCUMENTS

| | | |
|---|---|---|
| 6,431,144 B1 * | 8/2002 | Daly .......................... 123/399 |
| 6,443,128 B1 | 9/2002 | Pursifull et al. |
| 6,481,415 B1 | 11/2002 | Cook |
| 6,499,462 B1 | 12/2002 | Pursifull |
| 6,510,839 B1 | 1/2003 | Pursifull |
| 6,539,918 B1 * | 4/2003 | Pursifull .................... 123/399 |
| 6,543,415 B1 | 4/2003 | Pursifull et al. |
| 6,574,546 B1 | 6/2003 | Nada |
| 6,575,427 B1 | 6/2003 | Rauch et al. |
| 6,588,400 B1 * | 7/2003 | Gyoergy et al. ............ 123/399 |
| 6,619,106 B1 | 9/2003 | Pursifull |
| 6,622,984 B1 | 9/2003 | Rauch et al. |
| 6,641,111 B1 * | 11/2003 | Lorenz et al. ............... 251/305 |
| 6,701,891 B1 * | 3/2004 | Niki et al. ................... 123/396 |
| 6,711,492 B1 * | 3/2004 | Pursifull et al. ............ 701/114 |
| 2001/0000868 A1 | 5/2001 | Wayama et al. |
| 2001/0035157 A1 | 11/2001 | Wayama et al. |
| 2002/0033166 A1 | 3/2002 | Shimura et al. |
| 2002/0084433 A1 | 7/2002 | Rauch et al. |
| 2003/0075146 A1 | 4/2003 | Niki et al. |

FOREIGN PATENT DOCUMENTS

JP     2000320348 A   *   11/2000

* cited by examiner

ICE-BREAKING, AUTOZERO AND FROZEN THROTTLE PLATE DETECTION AT POWER-UP FOR ELECTRONIC MOTORIZED THROTTLE

FIELD OF THE INVENTION

The present invention relates to electronically controlled, motorized throttles for vehicle engines. In particular, the present invention relates to ice-breaking, autozero and frozen throttle plate detection features at power-up for such a throttle.

BACKGROUND OF THE INVENTION

Internal combustion engines used in automobiles typically operate on fuel-air mixtures, where a fuel injector supplies fuel and a throttle supplies air. On-board computers (also known as Powertrain Control Modules or PCMs) programmed to be responsive to a signal from an accelerator pedal in the automobile, determine the amounts of fuel and air. When a driver wishes to move at a higher speed, he or she presses the accelerator pedal, signaling the computer to supply more fuel, and more air to the engine. The fuel injectors respond by supplying more fuel and the throttle valve responds by opening wider to admit more air to the engine. When the driver wishes to slow down, the driver lifts his or her foot from the accelerator, signaling the fuel injectors to supply less fuel and the throttle to move to a more closed position.

In most internal combustion vehicle engines, a throttle valve controls the engine's idle speed. The throttle valve is typically a metal plate that is positioned on a rotating shaft within the air inlet conduit. The metal plate can be rotated to control the amount of air reaching the cylinders of an internal combustion engine. In many prior art vehicles, the throttle plate's rotational position may be controlled by a linkage connected to the accelerator pedal of the vehicle. The throttle plate may be positioned in a variety of positions, typically within the range of a wide-open, partially open and closed positions. The closed position is sometimes referred to as the "zero position."

In more modern throttles, an electric motor is utilized to set the throttle plate angle based on signals from an engine controller, such as an electronic Powertrain Control Module ("PCM"). Various inputs into the PCM, such as the accelerator pedal position and the present position of the throttle, are used to calculate the precise throttle plate angle to give the engine the desired performance. Motorized throttles or so-called "electronic throttles," often integrate with one or more Throttle Position Sensors ("TPS") to monitor the movement of the throttle plate. The sensors relay the varying movement of the throttle plate to the PCM.

When the PCM calls for more air, the shaft rotates in one direction to open the plate. When less air is needed, the shaft rotates in the opposite direction to close the plate. If the motor fails, the plate must move to a "default" position to maintain some level of engine function. A return spring causes the throttle to close toward the default throttle position when the motor ceases to provide a positioning torque. Default throttle positions are generally described in U.S. Pat. No. 6,129,071, incorporated by reference herein.

During extremely cold weather, there is a possibility of ice forming inside the throttle bore or throttle plate. The ice forms during operation. At engine off, the engine heat is transferred to the throttle, which causes the ice to melt, puddle at the plate edge, and then later re-freeze. The ice can prevent the throttle plate from moving during the next engine start and results in an obstructed (or frozen) throttle condition. This condition will result in degraded (or complete loss of) vehicle function. Vehicle function is affected because, without detection of the frozen throttle condition, normal fault detection and throttle control methods are insufficient to identify the condition and free the throttle plate. The undetected frozen throttle may cause an incorrectly recorded closed throttle position, which occurs when the throttle is incorrectly assumed to be closed. Other faults can also be caused by an undetected frozen throttle. These faults may be detected by the safety monitor system and prevent or limit vehicle operation.

Even if the plate does break free of the ice, an incorrect zero position reference causes higher than intended airflow, which adversely affects engine control. Thus, detection of frozen throttle condition is desired to enable the use of special control methods that can free the throttle plate before other faults are detected that would result in loss of vehicle function. Moreover, once the presence of ice is detected, a method of breaking the ice is desired that will not damage the throttle motor. Furthermore, a method that takes note of the throttle position sensor reading when the throttle is truly closed is desired.

BRIEF SUMMARY OF THE INVENTION

The present invention provides a method and system of removing an obstruction from a motorized throttle. In the preferred embodiments herein, the presence of an obstruction is detected inside a motorized throttle by throttle position sensors and a throttle controller, the obstruction is removed by a throttle motor, and a closed throttle position is set as a reference by the controller from which to control a motorized throttle plate to a desired angle. The present embodiments of the invention help reduce the possibility of degraded vehicle function and increase controllability of the throttle.

In one aspect of the present invention, a method is provided for detecting the presence of an obstruction inside a motorized throttle. The method includes the steps of comparing the recorded default position of the throttle to the recorded closed position of the throttle, and determining if the actual displacement between the two positions is less than a predetermined displacement.

In another aspect of the present invention, a method is provided for removing the obstruction within a motorized throttle. The method is performed using a throttle controller, and includes the steps of applying full motor voltage to the throttle motor in the opening direction, and then applying full motor voltage to the throttle motor in the closing direction. This accelerates the throttle's rotational inertia to near maximum speed and uses the impact torque to fracture the obstructing ice.

In yet another aspect of the invention, a method is provided for setting a closed throttle position as a reference from which to control a motorized throttle plate to a desired angle.

Other objects, features and advantages of the present invention will become more apparent from the following detailed description made with reference to the accompanying drawings.

DETAILED DESCRIPTION OF THE PREFERRED EMBODIMENTS OF THE INVENTION

Figure 1:
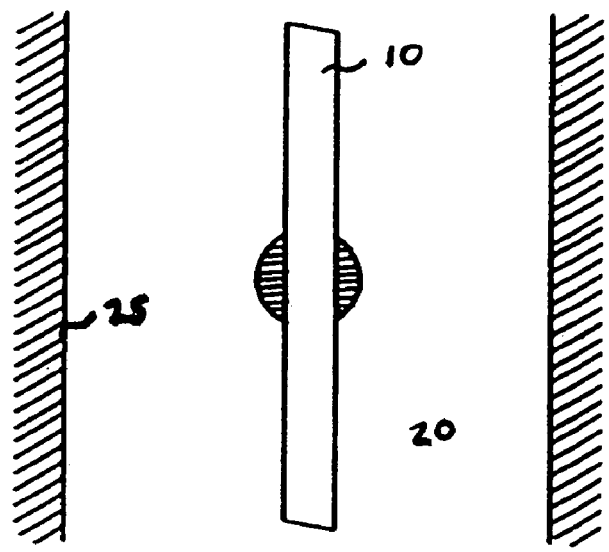
FIG. 1 is a cross-sectional diagram of the interior of a throttle bore illustrating a throttle plate in the open position.
Figure 2:
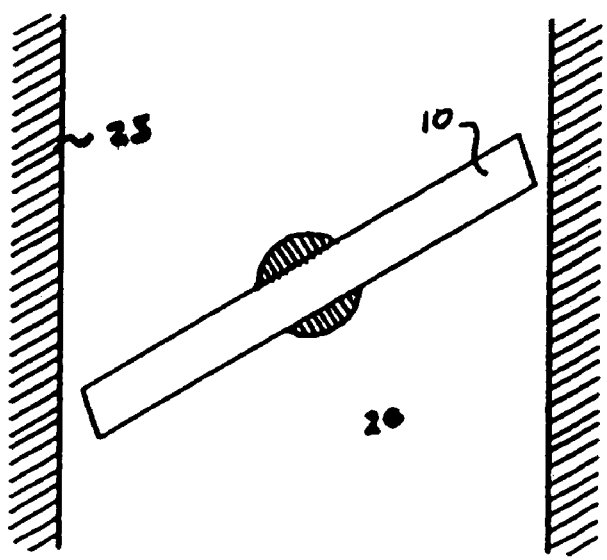
FIG. 2 is a cross-sectional diagram of the interior of a throttle bore illustrating a throttle plate in the default position.
Figure 3:
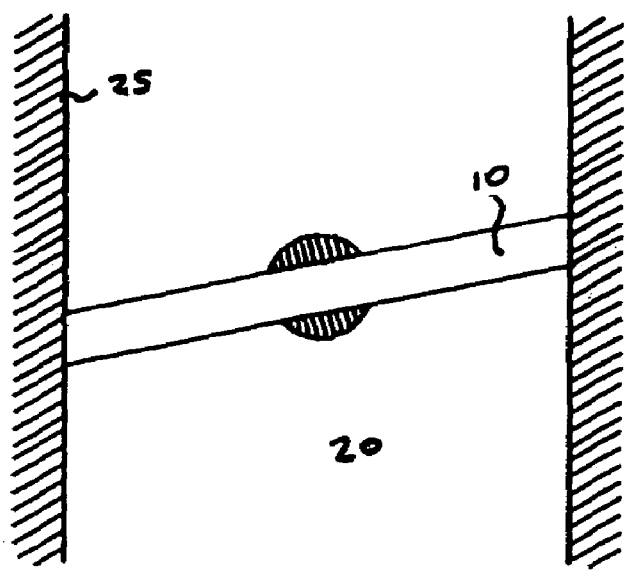
FIG. 3 is a cross-sectional diagram of the interior of a throttle bore illustrating a throttle plate in the closed position.
Figure 4:
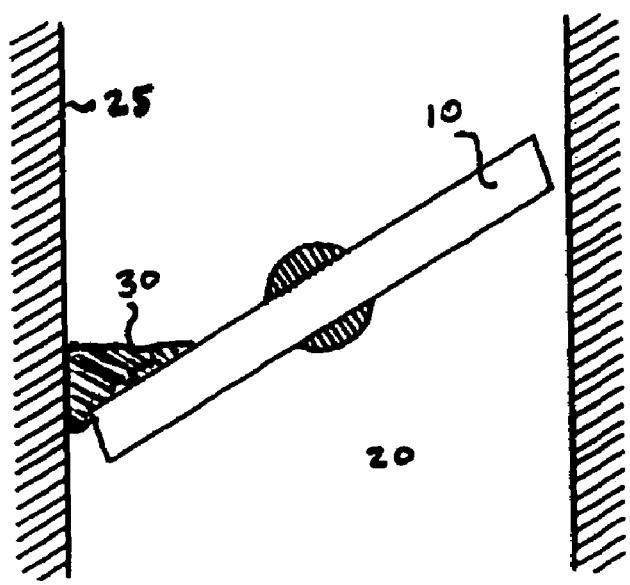
FIG. 4 is a cross-sectional diagram of the interior of a throttle bore illustrating an obstruction that prevents throttle plate movement.

A typical motorized throttle has an open position, as shown in FIG. 1. The throttle plate 10 is tilted into this open position to permit more air to flow toward the engine cylinders through bore 20, which is defined by at least one inner wall 25. The typical motorized throttle also has a default position. As shown in FIG. 2, the default position permits the vehicle to retain some level of functionality in the event the motor becomes unpowered due to reasons such as electronic driver failure, shorted or severed motor wires, and a shorted or open motor. The default position is achieved through mechanical means and allows the throttle plate 10 to remain slightly open when the drive mechanism is not powered. FIG. 3 shows the throttle plate 10 in a closed position, while FIG. 4 shows how an obstruction 30, such as ice, can prevent throttle plate movement by attaching to the throttle plate 10 and the at least one inner wall 25 that defines bore 20.

The structures described below are further shown and described in detail in the co-pending application Ser. No. 10/379,492 filed Mar. 4, 2003, the entirety of which is incorporated herein.

Figure 5:
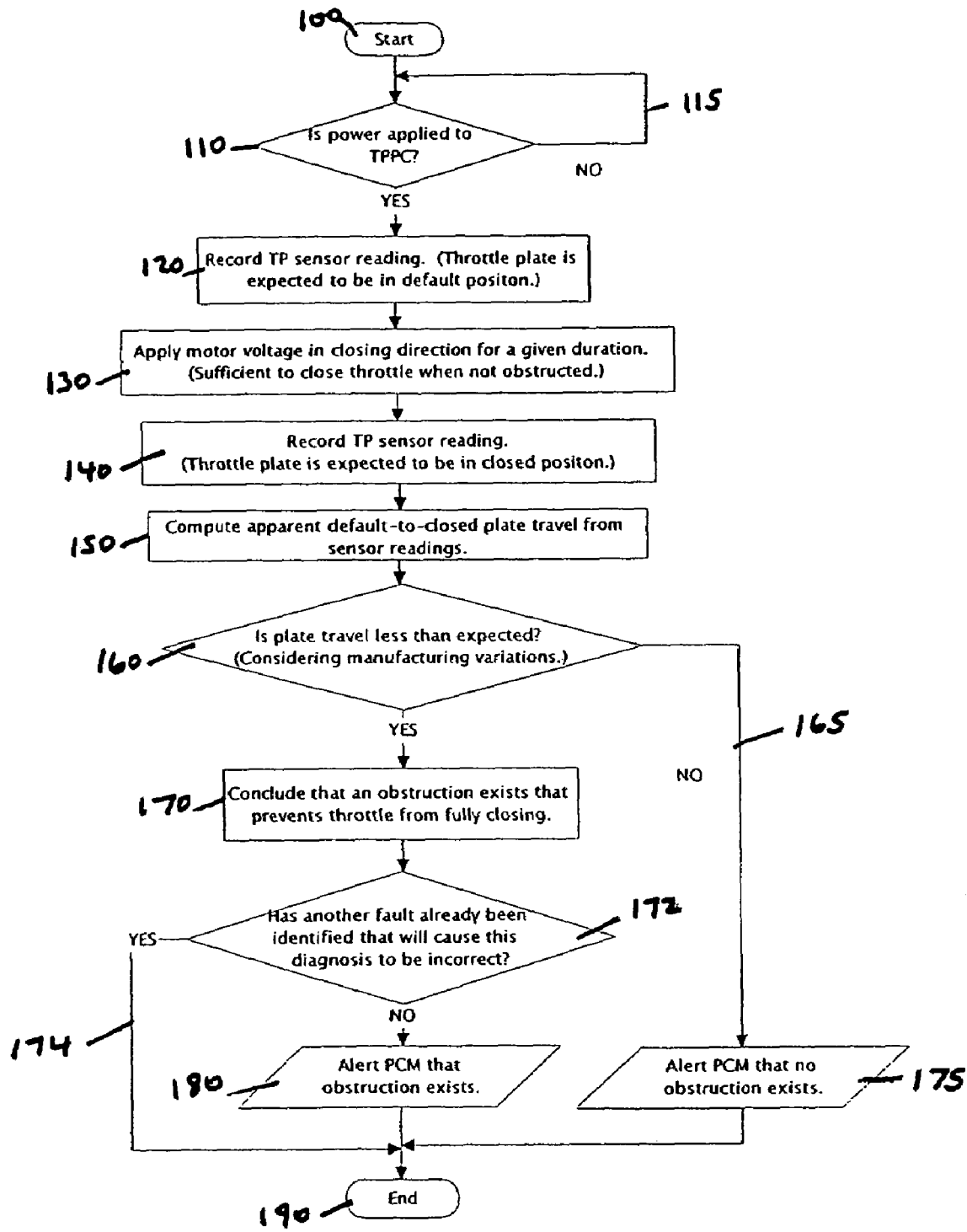
FIG. 5 is a flow diagram illustrating a first method of the present invention.

Turning to FIG. 5, a flow diagram showing exemplary steps of a method for detecting when an obstruction, such as ice, prevents throttle plate ("TP") movement (frozen throttle condition) is provided. Such a method is typically stored within a throttle plate position controller ("TPPC" or "throttle controller"). During engine starting (Step 100), power is applied to the TPPC. Since the throttle/controller was previously unpowered, the expected throttle plate position is the default position. As soon as power is applied to the TPPC (Step 110), it then records the sensor-perceived default position of the throttle plate (Step 120). The TPPC then attempts to force the throttle plate closed by applying voltage to the throttle motor (causing torque on the throttle plate) in the closing direction for a given duration (Step 130). The TPPC then records the sensor-perceived closed throttle position (Step 140).

The Throttle Position Sensors are preferably designed such that a valid measurement results in an output between 0.25 and 4.75 volts. The full sensing range of the PCM is 0 to 5 volts. Values near the rail voltages of 0 and 5 are indicative of a sensor or wiring error, such as a short or open. In this regard, the computation of valid throttle ranges is described in U.S. Pat. No. 6,619,106, incorporated by reference herein.

The voltage applied to the throttle motor is controlled by the electronic driver (transistors) called the H-bridge. In the event of very low motor resistance (often resulting from a shorted motor), the H-bridge signals the throttle controller indicating "current too high" and then it interrupts its normal function. Thus, an obstructed throttle may be confused with a shorted motor. Further, when a voltage is applied to the motor, current should flow. If zero or near-zero current results when voltage is applied to the motor, then the motor (or its wiring) is in open circuit. This condition is reported appropriately. Moreover, when this condition exists, the throttle controller does not attempt to detect whether the throttle is obstructed by ice (or foreign matter).

The sensor-perceived closed throttle position is used as the zero-degree reference from which to control the throttle plate to a desired angle. An incorrect closed throttle position is recorded when, for example, ice forms in the motorized throttle and prevents the throttle plate from moving. In a typical system, the frozen throttle condition results in degraded (or complete loss of) vehicle function.

Again referring to FIG. 5, after recording the sensor-perceived closed throttle position, the TPPC computes the angular displacement between the sensor-perceived default position and the sensor-perceived closed position (Step 150). Next, the angular displacement between the two positions is compared to a predetermined angular displacement (Step 160). The predetermined displacement is preferably 7 degrees and is derived from the nominal angle (8 degrees) less an angle variation due to manufacturing and wear (1 degree). If the sensor-perceived angular displacement is at least this predetermined angle (Step 165), the TPPC alerts the PCM that no obstruction exists (Step 175), and the routine ends (Step 190). However, if the sensor-perceived angular displacement is less than this predetermined angle, the TPPC concludes that an obstruction exists that prevents the throttle from fully closing (Step 170).

Nevertheless, ice on or around the throttle plate may not be the only cause for an incorrectly recorded closed throttle position. The present invention preferably differentiates between the existence of an obstruction that prevents the throttle from fully closing and other faults. As shown in FIG. 5, if the TPPC concludes that an obstruction exists that prevents the throttle from fully closing (Step 170), the TPPC preferably determines whether another fault has already been identified that will cause the frozen throttle diagnosis to be incorrect (Step 172).

In particular, the following potential faults may be identified before the TPPC concludes that an obstruction exists: throttle position sensors out-of-range, open motor circuit, faulted H-bridge status, mis-wire condition and default position out-of-range. For example, the detection of mis-wire condition is described in U.S. Pat. No. 6,543,415, incorporated by reference herein.

If another such fault has been identified (Step 174), the routine ends (Step 190). If another such fault has not been identified, the TPPC alerts the PCM's main microcontroller that an obstruction exists (Step 180) before the routine ends (Step 190).

Although the invention uses a comparison of the default and closed throttle positions as the primary indication of a frozen throttle, it is possible to use other comparisons to confirm identification of frozen throttle condition, or as the primary indicator of frozen throttle condition. For example, the closed throttle position could be compared to a previously recorded closed throttle position stored in memory. In systems where temperature data is available, temperature may be used to determine if the conditions exist for a frozen throttle.

Figure 6:
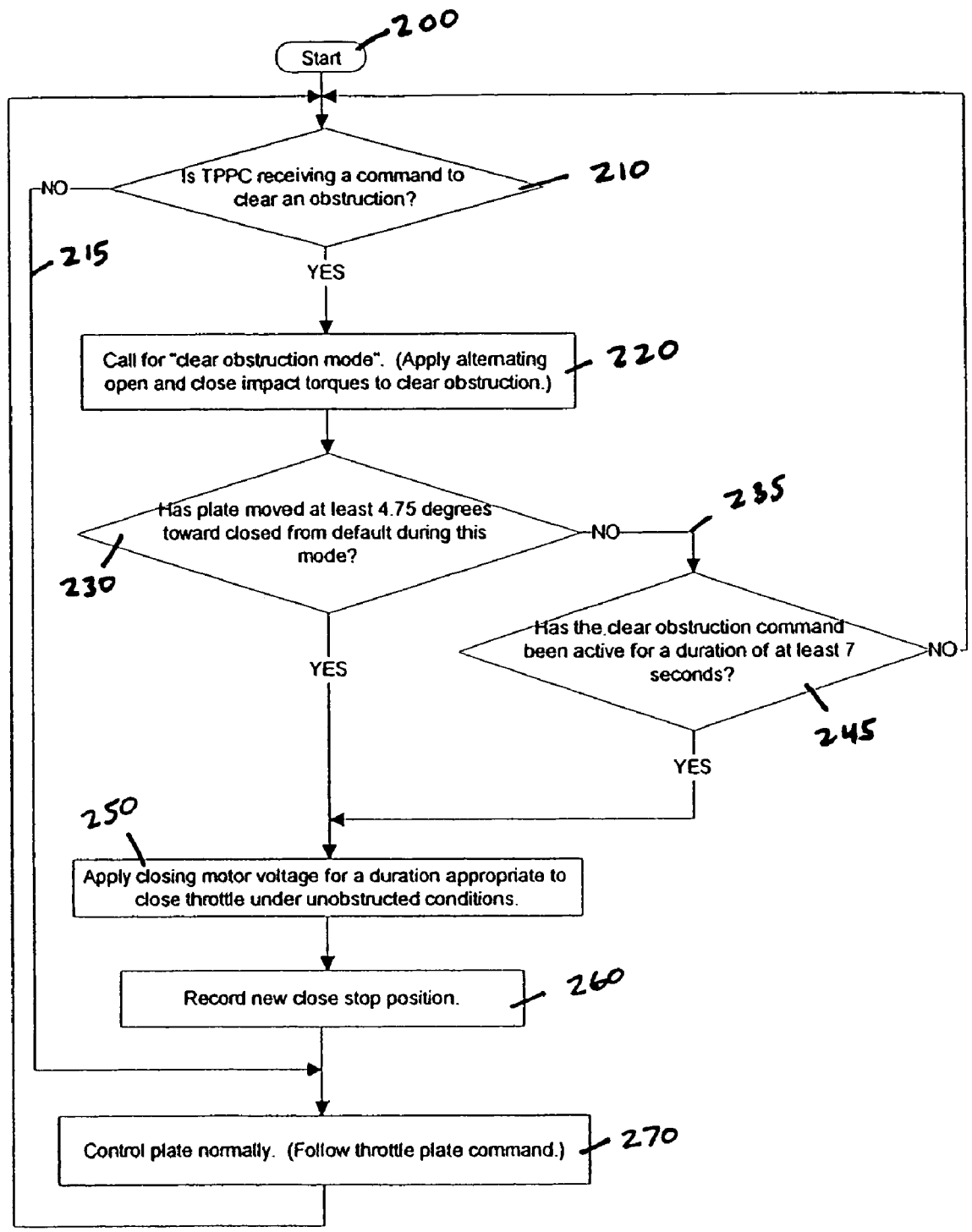
FIG. 6 is a flow diagram illustrating a second method of the present invention.
Figure 7:
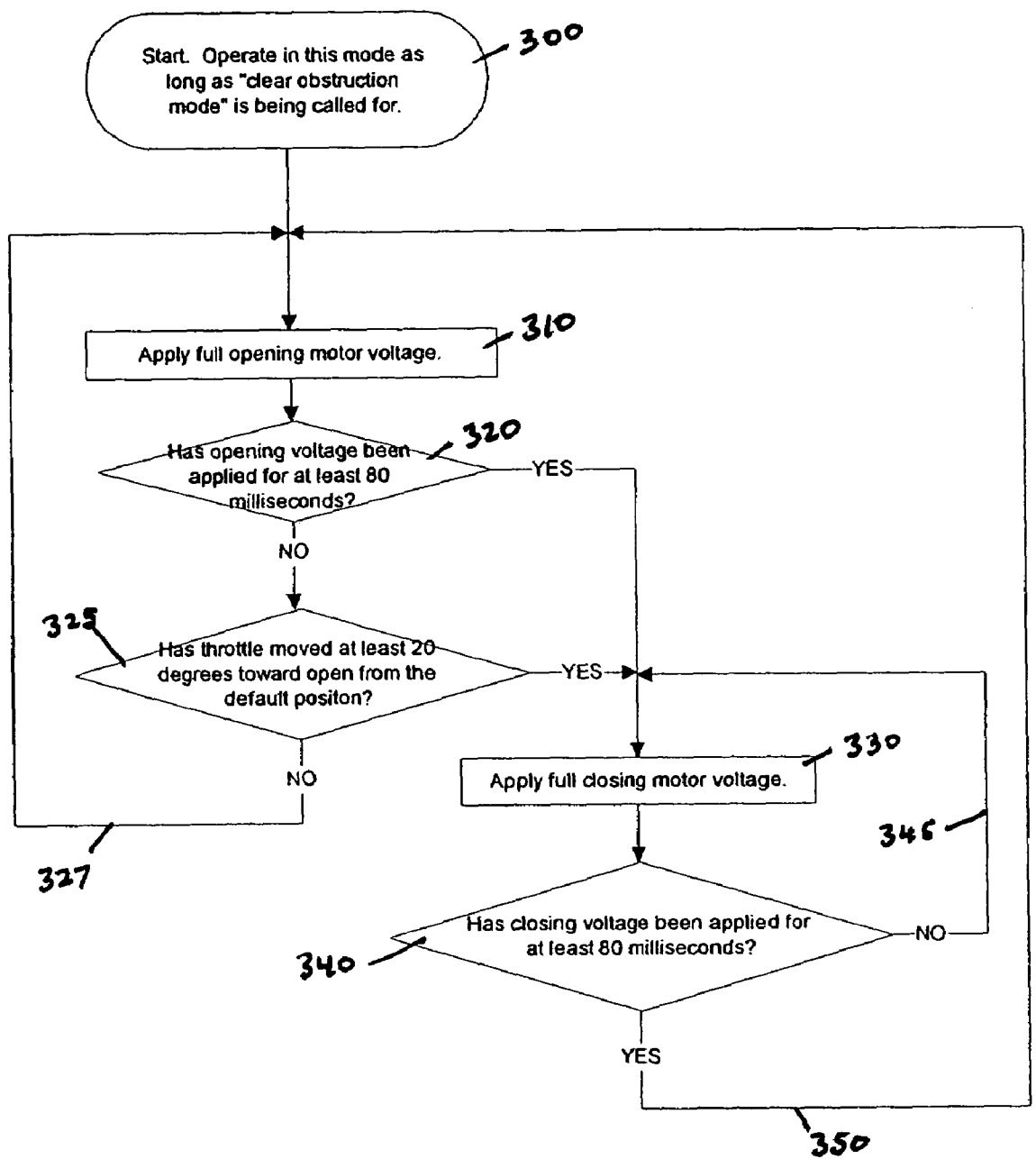
FIG. 7 is a flow diagram illustrating a third method of the present invention.

Once the TPPC alerts the PCM that an obstruction exists, the PCM's main microcontroller returns a command to the TPPC to remove the obstruction. FIGS. 6 and 7 are flow diagrams illustrating exemplary steps of a method for removing a throttle obstruction (ice-breaking) and a method for recording a new sensor-perceived closed throttle position (autozero). The routines implementing these methods are typically stored within the TPPC. As shown in FIG. 6, if the TPPC is not receiving a command to clear an obstruction (Step 215) then the throttle plate is controlled as in normal operation (Step 270). If the TPPC is receiving a command to clear an obstruction (Step 210), the TPPC then calls for a "clear obstruction mode" (Step 220).

As shown in FIG. 7, in "clear obstruction mode" (Step 300), the TPPC first applies a full motor voltage (Step 310) to the throttle motor in the opening direction. Full motor voltage is the maximum voltage that is available in a vehicle (nominally 12 volts). Full voltage results in maximum steady-state torque. Full throttle speed, approximately 1500 degrees per second, results in maximum impact torque. Maximum steady-state torque is thus applied to the throttle plate to force (or "bang") it in the opening direction. If the opening voltage has been applied for at least a predetermined duration (Step 320), preferably 80 milliseconds, full motor voltage is applied (Step 330) to the throttle motor in the closing direction. Full motor torque is thus applied to the throttle plate to force (or "bang") it in the closing direction. This ice-breaking routine relies only on a throttle motor and does not require any fixed frequency or vibration-enhancing devices. The routine is dynamically controlled and utilizes the full torque capacity of the motor to break the ice. In addition to the force exerted by the maximum applied steady-state torque, the gear lash of the motorized throttle enhances the ice-breaking by hammering the obstructing ice. Moreover, this ice-breaking routine is especially effective with complete ice-breaking in the lower throttle angle range below the default position (within 35 degrees of the closed position). This is because, for typical power-to-weight and throttle area-to-displacement ratios, engine operation usually occurs with throttle angles less than 35 degrees.

If the opening voltage has been applied for less than the predetermined duration, it is determined whether the throttle plate has moved at least a predetermined displacement (angular displacement between the sensor-perceived default position and the sensor-perceived closed position), preferably 20 degrees, towards the open position from the default position (Step 325). If the throttle has moved less than the predetermined displacement, "clear obstruction mode" continues (Step 327) by continuing to apply full opening motor voltage (Step 310). If the throttle plate has moved at least the predetermined displacement, full closing motor voltage is then applied (Step 330).

If closing voltage has been applied for another predetermined duration (Step 340), preferably 80 milliseconds, then (Step 350) full opening motor voltage is re-applied (Step 310). If the closing voltage has been applied for less than the predetermined duration, then (Step 345) full closing motor voltage continues (Step 330).

Turning back to FIG. 6, the TPPC operates in "clear obstruction mode" until the throttle plate has moved at least a predetermined displacement (angular displacement between the default position and the closed position) (Step 230). This predetermined displacement is preferably 4.75 degrees. However, if the throttle plate has moved less than the predetermined displacement (Step 235), the TPPC will still exit the "clear obstruction mode" if the "clear obstruction" command in the TPPC has been active for a predetermined duration (Step 245). Preferably, the predetermined duration is about 7 seconds so as to avoid damage to the throttle motor.

Once the TPPC exits the "clear obstruction mode," the TPPC performs a routine to record a new (and correct) sensor-perceived closed throttle position. The TPPC applies a full motor voltage in the closing direction for another duration (Step 250). The full motor voltage is preferably applied for 40 milliseconds duration to ensure the plate is fully closed. The motor voltage is then preferably reduced to about 5 volts for another 40 milliseconds. 5 volts are sufficient to achieve the closed throttle position and are sustainable indefinitely without any damage to the motor.

Next, the TPPC records a new (correct) sensor-perceived closed throttle position before returning to normal throttle plate control (Step 260). Preferably, a multiple sample average is calculated and an offset of 0.0625 degrees is added to produce the new (correct) sensor-perceived closed throttle position. A multiple sample average (or median) is used to avoid ill-effects from electrical noise that may affect the sensor reading. The offset prevents the throttle control from using anomalous sensor readings that occur near mechanism discontinuities, such as a closed throttle. PCM main microcontroller-issued throttle commands are ignored until the new (correct) sensor-perceived closed throttle position is recorded. The throttle plate is then controlled as in normal operation (Step 270).

It is therefore intended that the foregoing description illustrates rather than limits this invention, and that it is the following claims, including all equivalents, which define this invention. Of course, it should be understood that a wide range of changes and modifications may be made to the embodiments and preferences described above. Accordingly, it is the intention of the applicants to protect all variations and modifications within the valid scope of the present invention. It is intended that the invention be defined by the following claims, including all of the equivalents thereto.

The invention claimed is:

1. A method of detecting the presence of an obstruction inside a motorized throttle, comprising the steps of:
   recording a default position of a throttle plate;
   applying a predetermined voltage to the throttle motor in the closing direction for a predetermined time;
   recording a provisional closed position of the throttle plate;
   determining a first displacement between the recorded default position and the recorded provisional closed position; and
   if the first displacement is less than a predetermined displacement then indicating that the obstruction is present.

2. The method of claim 1 further comprising the steps of verifying the absence of defined faults and reporting the presence of an obstruction to a powertrain control module.

3. The method of claim 1 further comprising the step of alerting a powertrain control module that no obstruction exists if the first displacement is at least the predetermined displacement.

4. The method of claim 1 wherein the predetermined displacement is 7 degrees.

5. A method of removing an obstruction inside a motorized throttle comprising the steps of:

recording a default position of a throttle plate;

applying a predetermined voltage to a throttle motor in a closing direction for a predetermined time;

recording a provisional closed position of the throttle plate by a throttle position sensor;

determining a first displacement between the recorded default position and the recorded provisional closed position;

identifying an obstruction if the first displacement is less than a predetermined displacement;

if the obstruction is identified then applying a predetermined deflection voltage to the throttle motor to bang the throttle plate in a first direction; and after banging the throttle plate in the first direction applying the predetermined deflection voltage to the throttle motor to bang the throttle plate in a second direction.

6. The method of claim 5 wherein the step of applying a predetermined deflection voltage to a throttle motor in a first and a second direction is performed within respective time periods adapted to prevent damage to the throttle motor.

7. The method of claim 5 wherein the predetermined deflection voltage is 12 volts.

8. A method of accurately recording an actual closed throttle position of a throttle plate as a reference, comprising the steps of:

recording a default position of the throttle plate;

applying a predetermined deflection voltage to a throttle motor for driving the throttle plate in a closing direction for a predetermined time;

recording a provisional closed position as a zero degree reference from which to control the throttle plate to a desired angle;

determining a first displacement between the recorded default position and the recorded provisional closed position; and if the first displacement is greater than a predetermined displacement, then adopting the provisional closed position as the actual closed throttle position.

9. The method of claim 8 wherein the predetermined time is 40 milliseconds.

10. The method of claim 8 wherein the predetermined deflection voltage is 12 volts.

11. A system for removing an obstruction inside a motorized throttle, comprising:

a throttle plate; and a throttle motor, wherein a predetermined deflection voltage is applied to the throttle motor resulting in an impact torque applied to the throttle plate for banging the throttle plate in a first and a second direction, and wherein the predetermined deflection voltage is applied to the throttle motor for a predetermined limited time in each direction for preventing damage to the throttle motor.

12. The system of claim 11 wherein the predetermined torque is maximum steady-state torque.

13. The system of claim 11 wherein the predetermined time is 80 milliseconds.

* * * * *